June 15, 1943.    C. FARNY    2,321,738
APPARATUS FOR PRODUCING MULTI-PLY TUBING
Filed March 20, 1941
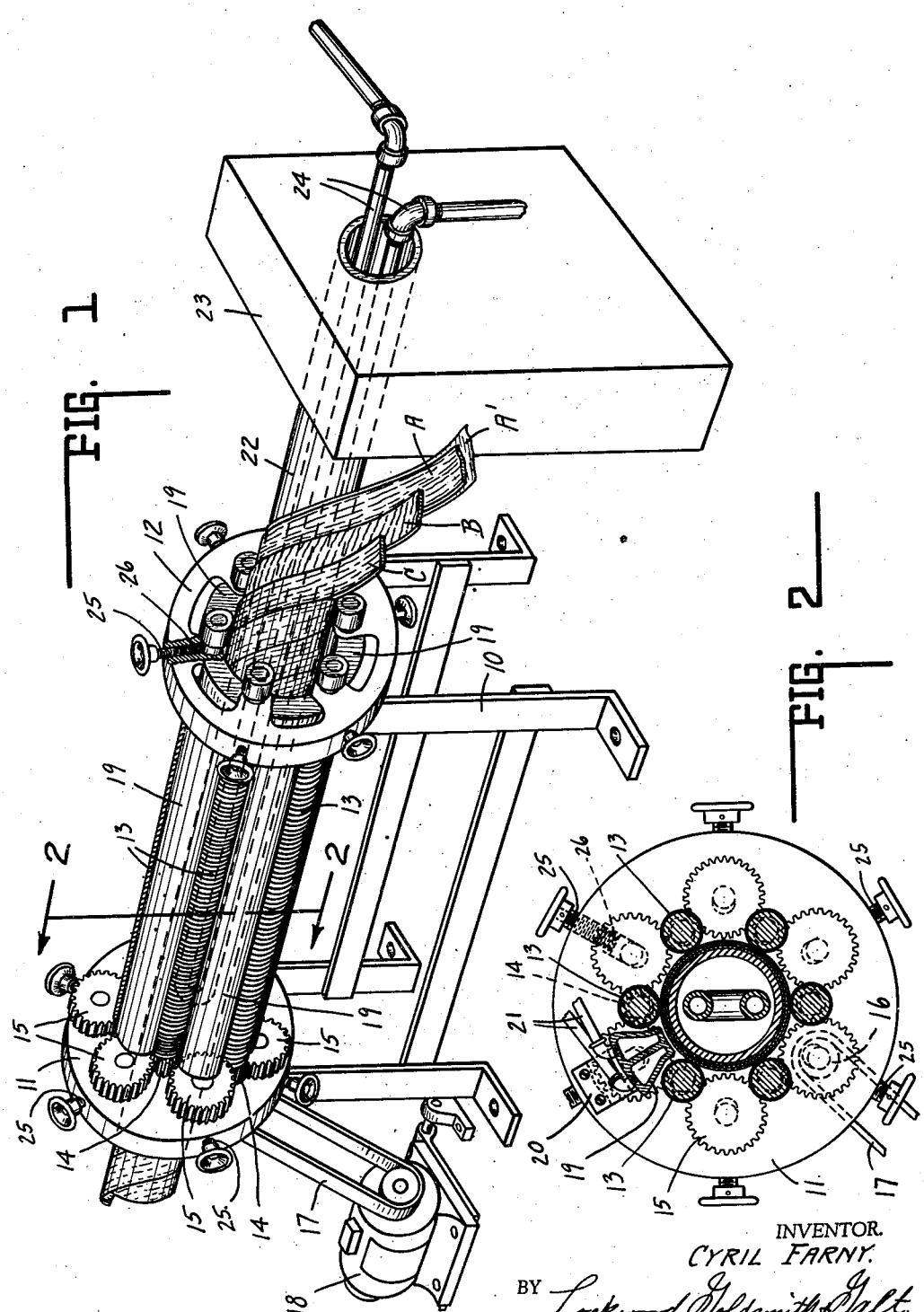
INVENTOR.
CYRIL FARNY.
BY Lockwood, Goldsmith & Galt
ATTORNEYS.

Patented June 15, 1943

2,321,738

UNITED STATES PATENT OFFICE 2,321,738

APPARATUS FOR PRODUCING MULTIPLY TUBING

Cyril Farny, St. Charles, Ill., assignor to The Rudolph Wurlitzer Company, Cincinnati, Ohio, a corporation Application March 20, 1941, Serial No. 384,249

7 Claims. (Cl. 144—268)

This invention relates to an apparatus for use in the production of multi-ply tubing, and particularly the continuous production thereof from spiralled strips of flexible material such as veneer.

The object of the invention is to provide a machine in which multi-ply tubing of spirally wound strips of flexible material may be continuously and rapidly produced and then cut to the desired lengths, as distinguished from present known methods and apparatus of producing such tubing in individual sections of predetermined length. The tubing thus produced may be of two or more laminations or layers of strips spirally wound about a mandrel, and bonded by a suitable bonding agent, such as a thermo-setting resin glue, which bonding agent becomes set upon the simultaneous application of heat and pressure as the windings pass through the machine.

One feature of the invention resides in the provision of means for simultaneously applying the heat and pressure as the spirally wound strips continuously pass through the forming machine. This may be accomplished, for example, as illustrated herein, by the provision of external pressure rollers which, in conjunction with the mandrel upon which the strips are wound, exerts a pressure thereon. Heat may, as illustrated herein, be applied simultaneously with the application and pressure and both internally and externally of the spirally wound strips through the medium of the source of heat within the mandrel, and heating shoes spaced externally about the spirally wound strips.

Another feature of the invention is directed to suitable means to continuously withdraw the formed and set spirally wound tubing from the mandrel and draw or feed the strips thereto. This may be accomplished as herein illustrated by causing relative movement between the formed tubing and a screw feeding device. Thus, one embodiment of this feature of the invention may effect the feeding of the tubing longitudinally of the mandrel, wherein the mandrel is stationary and the tubing is drawn longitudinally thereof for discharge by the screw feeding action of a series of combination pressure and screw feeding rollers mounted about the periphery of the tubing. The screw pressure rollers in this instance are externally provided with screw threads which will engage and bite into the surface of the formed tubing and by their rotation will exert a force thereon longitudinally of the mandrel. Since the tubing is slidable longitudinally of the mandrel it will tend to impart a combined rotary and longitudinal sliding movement thereto.

The full nature of the invention will be understood from the accompanying drawings and the following description and claims:

Fig. 1 is a perspective view of the multi-ply tube forming machine with the supporting brackets for the heat applying shoes removed. Fig. 2 is a section taken on the line 2—2 of Fig. 1 with all but one of the heat applying shoes and supporting brackets removed for the purpose of clearness.

In the drawing there is shown a supporting frame 10 upon which there is mounted a pair of spaced heads 11 and 12. Intermediate said heads there is pivotally supported for rotation a plurality of pressure and feeding rollers 13 having peripheral screw teeth formed on their periphery for the purpose hereinafter described. Each of said pressure and feed rollers is provided with a driving gear 14 adjacent the head 11 adapted to mesh with and be driven by the intermediate driving gears 15, each of which is rotatably supported on the head 11 in meshing engagement with the adjacent gears 14. The supporting shaft of one of the gears 15 extends through a suitable bearing in the head 11 and is provided with a pulley 16 keyed thereto adapted to be driven by the belt 17 from the motor 18. Thus, through said gears each of the pressure rollers is caused to rotate by said motor.

Intermediate each of said rollers and extending substantially the length thereof, there is provided a series of heat applying shoes 19, said shoes being supported by suitable brackets 20 mounted upon the inner faces of the heads 11 and 12. Any suitable heating medium may be applied to the said heating shoes, such as through the application of steam by the steam pipes 21 or electric heating elements or similarly connected with a source of current.

Extending through the heads and within the confinement of the pressure and feeding rollers, as well as the heating shoes, there is a fixed tubular mandrel 22 fixedly supported at one end by the supports 23. Within said mandrel there is a heating unit in the form of the steam pipes 24, said pipes extending substantially the full length of said mandrel.

For forming the multi-ply tubing, a plurality of strips A, B and C which may be of wood veneer or the like are spirally fed between the mandrel and said pressure and feeding rollers. The strip A is fed about the mandrel to form an inner spirally wound layer of tubing with the edges of the strip abutting and wherein the grain of the veneer preferably extends longitudinally thereof. The strip B is similarly wound over the strip A to form an intermediate layer, preferably with its grain running crosswise of the strip. The strip C is similarly wound over the intermediate layer B to form the outer layer of the tubing, preferably with its grain against running longitudinally. Thus, as shown herein, the tubing, formed by the machine will be of three layers with the alternate layers having, in the case of wood veneer strips, a grain running in an opposite direction to the intermediate layer or layers.

As the spiral winding of the several strips progresses, the tubing is formed upon the fixed mandrel and is rotated thereabout by the pressure and feeding rollers 13. For this purpose the screw threads of said pressure rollers bite into the periphery of the spirally wound tubing sufficiently to impart rotation thereof about the mandrel and feed the rotating tubing forwardly and longitudinally thereof to effect its discharge from the free end of the mandrel as a continuous tubular structure. As it is thus fed by the rollers 13, pressure is applied thereby simultaneously with the application of both internal and external heat. This has the effect of causing the bonding material to be set during the passage of the formed tubing between the heads 11 and 12.

It is here to be noted that a suitable bonding material, such as a thermo-setting resin glue, may be applied to the adjacent surfaces of the strips as they are drawn about the mandrel, but more preferably said bonding material is first applied to the strips prior to their application about the mandrel and permitted to penetrate and dry, after which the forming operation takes place. With the proper surfaces of the strips impregnated with the dry bonding material, said material will promptly exert its adhesive qualities and become set by the application of the heat and pressure as the formed tubing is passed between the heads 11 and 12.

The pressure exerted by the rollers 13 may be controlled by the adjusting screws 25 which adjustably bear upon the spindles of the rollers and driving gears within the respective heads 11 and 12 and through the pressure springs 26 mounted therein.

Should there be any difficulty in respect to glue forming on the mandrel or rollers or heating shoes, suitable paper liners may be provided for protection of these parts. It is particularly important that the surface of the mandrel be maintained sufficiently smooth to permit the ready rotary and longitudinal sliding movement of the formed tubing. Thus, for protective purposes a paper lining A' may be fed about the mandrel under the inner strip A, and in like manner a paper liner may be fed under the pressure rollers with and over the strip C. For further assuring the sliding action, suitable oil may be applied to the mandrel or the paper liner A' impregnated with a suitable oil.

In order to start the operation, the several strips may be first formed into tubing on another mandrel with a hand operation. After a sufficient section of tubing is thus provided, the pressure rollers are released by the screws 25 and the tubing is slipped onto the mandrel 22 with the free end under said rollers. Thereupon, the rollers are tightened to exert the proper pressure and in the case of wood veneer additional strips are butt-glued to the ends of the strips forming the initial tubing. The machine is then set into operation so that the initial tubing is rotatably fed along the mandrel, drawing with it the continuations of the several strips which may have been spliced or butt-glued thereto. However, such initial tubing may be formed directly upon the mandrel 22 by partially releasing the adjusting screws 25 on the head 22 and hand wrapping the strips about the mandrel while rotating the tubing thus formed and sliding it along the mandrel until it becomes sufficiently engaged by the pressure rollers 13. The screw 25 may then be tightened and the rollers set into operation to thereupon mechanically rotate and slide the formed tubing on the mandrel as above described.

The peripheral screw teeth formed on and about the periphery of the feeding rollers 13 have a sharp biting edge such as will engage with the surface of the tubing to effect its movement. To this end the pitch of the screw teeth is such that by reason of the rotation of the rollers relative to the tubing, longitudinal movement will be imparted thereto such as to slide the tubing over and from the mandrel. At the same time, the frictional resistance between the screw teeth and material of the tubing, as may be readily controlled by the degree of pitch of the teeth, will effect a certain amount of drag sufficient to impart rotation to the tubing about the mandrel and in the directional rotation of the rollers. Thus, the biting action of the teeth coupled with the direction and degree of pitch has the effect of simultaneously rotating the tubing about the mandrel for effecting the spiral winding action of the strips thereabout, and longitudinal movement of the tubing with respect to the mandrel and rollers for feeding it therefrom after winding.

Thus, when the machine is in operation and the initial tubing is formed about the mandrel and engaged by the feeding rollers as above described, continued rotation of said rollers causes rotation of strips about the mandrel to effect the winding thereof into a tubing form, whereupon the tubing is simultaneously fed longitudinally over the mandrel and from the discharge end thereof. At the same time the pressure between the rollers and mandrel presses the strips about each other to effect a permanent seal between the several layers due to the adhesive which is internally heated by the heating elements within the mandrel and externally heated by the heating elements mounted intermediate the feeding rollers.

The invention claimed is:

1. An apparatus for continuously forming multi-ply tubing comprising a cylindrical mandrel about which a plurality of strips of flexible material are spirally wound, means for supporting said mandrel, a plurality of cylindrical screw feeding members supported about the periphery of said mandrel and extending longitudinally thereof, said members being provided with peripherally disposed screw threads, means adapted to effect operative engagement of said screw threads with the exterior surface of the formed tubing, and means operable to cause relative rotation between said screw feeding members and formed tubing, whereby said members will act to slide said tubing longitudinally of said mandrel.

2. An apparatus for continuously forming multi-ply tubing comprising a cylindrical mandrel about which a plurality of strips of flexible material are spirally wound, means for supporting said mandrel, a cylindrical feeding member supported longitudinally over said mandrel for contacting engagement with the exterior surface of the tubing formed and supported thereabout, said member having peripheral screw teeth thereon engageable with said surface of the tubing, and means operable to cause relative rotation between said tubing and member, the direction and pitch of said teeth being such as to cause said relative rotation to effect longitudinal movement of said tubing with respect to said member and mandrel, whereby said tubing will be fed therefrom.

3. An apparatus for forming multi-ply tubing comprising a cylindrical mandrel about which a plurality of strips of flexible material are spirally wound, heat generating means within said mandrel adapted to supply said tubing with internal heat, a series of pressure rollers mounted externally of and about said mandrel and adapted to exert external pressure upon the tubing carried thereby, means operable to cause relative rotation between said rollers and mandrel, and a plurality of heating elements intermediate said rollers mounted externally of said mandrel and surrounding the tubing carried thereby adapted to apply external heat simultaneously with the application of internal heat and external pressure upon the formed tubing.

4. An apparatus for continuously forming multi-ply tubing comprising a fixed cylindrical mandrel about which a plurality of strips of flexible material are spirally wound, means for supporting said mandrel in stationary position, a plurality of pressure rollers mounted about and surrounding the periphery of said mandrel and longitudinally fixed relative thereto for engaging the exterior peripheral surface of said strips as the tubing is formed and supported between said mandrel and rollers, spiral screw threads formed about each of said pressure rollers engageable with the said exterior peripheral surface of said strips, and means for rotating said rollers relative to said mandrel whereby a combined rotary and longitudinal movement of the tubing formed by said strips will be effected through the engagement of the screw threads therewith.

5. An apparatus for continuously forming multi-ply tubing comprising a cylindrical mandrel about which a plurality of strips of flexible material are spirally wound, means for supporting said mandrel in fixed position, a pair of heads mounted about said mandrel spaced longitudinally thereof from each other and from the surface of said mandrel, a plurality of screw threaded rollers rotatably supported at their opposite ends by said heads about and longitudinally of said mandrel in position for the screw threads thereon to engage the periphery of the tubing formed about and supported over said mandrel, and means for rotating said rollers relative to said mandrel whereby said screw threads will act upon the tubing carried thereby to simultaneously rotate said tubing and slide it longitudinally thereover.

6. An apparatus for continuously forming multi-ply tubing comprising a cylindrical mandrel about which a plurality of strips of flexible material are spirally wound, means for supporting said mandrel in fixed position, a pair of heads mounted about said mandrel spaced longitudinally thereof from each other and from the surface of said mandrel, a plurality of screw threaded rollers rotatably supported at their opposite ends by said heads about and longitudinally of said mandrel in position for the screw threads thereon to engage the periphery of the tubing formed about and supported over said mandrel, a gear connected with the end of each of said rollers, intermediate driving gears supported by one of said heads in position to mesh with the adjacent gears carried by said rollers, and means for rotating one of said gears for imparting simultaneous rotary movement to said rollers through the remaining gears whereby the screw threads of said rollers will simultaneously effect a rotary and sliding movement of the tubing engaged thereby with respect to said mandrel.

7. An apparatus for continuously forming multi-ply tubing comprising a cylindrical mandrel about which a plurality of strips of flexible material are spirally wound, means for fixedly supporting said mandrel, a heating element within said mandrel for transmitting heat to the internal surface of the tubing formed thereon by said spiral winding, a plurality of pressure rollers mounted about said mandrel adapted to exert radial pressure thereagainst and against the internally heated tubing formed thereon, each of said pressure rollers having its periphery formed with screw threads adapted to engage with the external surface of the formed tubing, means for rotating said pressure rollers relative to said mandrel, whereby said screw threads will cause the formed tubing engaged thereby to slide about said mandrel and longitudinally thereof, and a series of spaced heating elements mounted intermediate said rollers adapted to transmit heat to the external surface of the formed tubing while under pressure from said rollers.

CYRIL FARNY.